United States Patent
Tariq et al.

(10) Patent No.: US 11,671,025 B2
(45) Date of Patent: Jun. 6, 2023

(54) ELECTRICAL POWER DISTRIBUTION

(71) Applicant: ROLLS-ROYCE plc, London (GB)

(72) Inventors: Mohd Tariq, Derby (GB); Chandana J Gajanayake, Derby (GB); Ali I Maswood, Derby (GB); Amit K Gupta, Derby (GB)

(73) Assignee: ROLLS-ROYCE PLC, London (GB)

( * ) Notice: Subject to any disclaimer, the term of this patent is extended or adjusted under 35 U.S.C. 154(b) by 426 days.

(21) Appl. No.: 16/999,680

(22) Filed: Aug. 21, 2020

(65) Prior Publication Data
US 2021/0075331 A1     Mar. 11, 2021

(30) Foreign Application Priority Data

Sep. 6, 2019  (IN) .............................. 201911035940
Oct. 23, 2019 (GB) ..................................... 1915331

(51) Int. Cl.
*H02M 3/335* (2006.01)
*B60L 53/20* (2019.01)
(Continued)

(52) U.S. Cl.
CPC ......... *H02M 3/33584* (2013.01); *B60L 53/20* (2019.02); *H01F 30/04* (2013.01);
(Continued)

(58) Field of Classification Search
CPC ............. H02M 3/33584; H02M 3/158; H02M 3/3376; H01F 30/04; H02J 7/007;
(Continued)

(56) References Cited

U.S. PATENT DOCUMENTS

| 7,796,410 B2 | 9/2010 | Takayanagi et al. |
| 2008/0101096 A1 | 5/2008 | Takayanagi et al. |

(Continued)

FOREIGN PATENT DOCUMENTS

| EP | 1919070 A2 | 5/2008 |
| KR | 10 2015 0111093 A | 10/2015 |
| WO | 2019/062086 A1 | 4/2019 |

OTHER PUBLICATIONS

Search Report of the Intellectual Property Office of the United Kingdom for GB1915331.1 dated Mar. 18, 2020.
(Continued)

*Primary Examiner* — Rafael O De Leon Domenech
(74) *Attorney, Agent, or Firm* — Oliff PLC (57) ABSTRACT

Electrical power distribution systems and methods of operating electrical power distribution systems are provided. One electrical power distribution system comprises: an electrical power storage unit; a transformer; a first bidirectional converter circuit connected between the electrical power storage unit and a first winding of the transformer; a first DC bus; a second DC bus; a second bidirectional converter circuit connected between the first DC bus and a second winding of the transformer; a third bidirectional converter circuit connected between the second DC bus and a third winding of the transformer; and a controller connected for control of the first, second and third converter circuits to distribute electrical power between the electrical power storage unit, the first DC bus and the second DC bus.

18 Claims, 11 Drawing Sheets

(51) Int. Cl.
  *H01F 30/04* (2006.01)
  *H02J 7/00* (2006.01)
  *H02M 3/158* (2006.01)
  *H02M 3/337* (2006.01)

(52) U.S. Cl.
  CPC ............ *H02J 7/007* (2013.01); *H02M 3/158* (2013.01); *H02M 3/3376* (2013.01); *B60L 2200/10* (2013.01); *B60L 2210/10* (2013.01); *B60L 2210/40* (2013.01); *H02J 2207/20* (2020.01)

(58) Field of Classification Search
  CPC .. H02J 2007/20; B60L 53/20; B60L 2200/10; B60L 2210/10; B60L 2210/40
  See application file for complete search history.

(56) References Cited

U.S. PATENT DOCUMENTS

| | | |
|---|---|---|
| 2013/0020989 A1 | 1/2013 | Xia et al. |
| 2014/0333126 A1* | 11/2014 | Vyas .................... H02J 3/46 307/9.1 |
| 2016/0036220 A1 | 2/2016 | Lacaux et al. |
| 2018/0183344 A1* | 6/2018 | Iwaya ............... H02M 3/33592 |
| 2019/0143822 A1 | 5/2019 | Malek et al. |
| 2020/0195018 A1 | 6/2020 | Liu et al. |

OTHER PUBLICATIONS

Jan. 26, 2021 Search Report issued in European Patent Application No. 20189752.7.

\* cited by examiner

ELECTRICAL POWER DISTRIBUTION

CROSS-REFERENCE TO RELATED APPLICATIONS

This specification is based upon and claims the benefit of priority from Indian Patent Application Number 201911035940 filed on 6 Sep. 2019 and UK Patent Application Number 1915331.1 filed on 23 Oct. 2019, the entire contents of which are incorporated herein by reference.

TECHNICAL FIELD

The present disclosure concerns electrical power distribution, for example for use in an aircraft, in which electrical power is distributed between an electrical storage unit and two or more DC buses depending on power availability and power requirements.

BACKGROUND

Electrical power requirements are currently generally increasing for modern aircraft systems, and will tend to continue to increase, particularly with the advent of hybrid or fully electrically powered aircraft. A widely used term "more electric aircraft" (MEA) describes aircraft with increasing use of electric systems to operate more of an aircraft's control systems, which may for example replace existing hydraulic systems. Generally electrical power in an MEA is supplied through connecting an electric generator to a gas turbine on the aircraft, which may be one of the turbines used for propulsion or may be a dedicated gas turbine solely for electrical generation. The generated electrical energy is converted and distributed to supply various loads throughout the aircraft.

Traditionally, a battery may be used for starting of the engine with an electric starter generator set and for providing a power supply to emergency loads. Battery power may more recently also be used for mitigating a shortfall of the power on the electrical distribution bus, for power/energy balancing for improving the distribution network operation and for also applications like hybrid and full electric propulsion. It is increasingly important therefore to integrate the battery with the aircraft power distribution architecture so as to fulfil different requirements of the system. Generally, aircraft applications are sensitive to weight, which becomes one of the critical factors for consideration and selection for various electrical architectures and solutions that can be implemented in aircraft. Therefore, it is important to have solutions capable of reducing the weight of the overall system.

SUMMARY

According to a first aspect there is provided a method of operating an electrical power distribution system, the system comprising:
an electrical power storage unit;
a transformer having first, second and third windings;
a first bidirectional converter circuit connected between the electrical power storage unit and the first winding;
a first DC bus;
a second DC bus;
a second bidirectional converter circuit connected between the first DC bus and the second winding; and
a third bidirectional converter circuit connected between the second DC bus and the third winding,
the method comprising:
determining a state of charge of the electrical power storage unit;
determining a power requirement or power availability at each of the first and second DC buses; and
operating the first, second and third bidirectional converter circuits to balance electrical power distribution between the electrical power storage unit and the first and second DC buses.

Operating the first, second and third bidirectional converter circuits may comprise transferring electrical power from the electrical storage unit to the first DC bus and/or the second DC bus if the power availability of the electrical power storage unit is greater than either or both of the determined power requirements at the first and second DC buses.

The second DC bus may be connected to an electrical generator and operating the first, second and third bidirectional converter circuits may comprise transferring electrical power from the second DC bus to the electrical storage unit if the power availability at the second DC bus is greater than the power requirement at the electrical power storage unit.

The first and second DC buses may be connected to respective first and second electrical generators and operating the first, second and third bidirectional converter circuits may comprise transferring electrical power from the first DC bus and second DC bus to the electrical storage unit if the power availability at the second DC bus is greater than zero but less than the power requirement at the electrical power storage unit and the power availability at the first DC bus is greater than zero.

Operating the first, second and third bidirectional converter circuits may comprise transferring electrical power from the first DC bus to the second DC bus if a calculated power at the second bidirectional converter circuit is greater than a rated power for the second bidirectional converter circuit and a calculated power at the third bidirectional converter circuit is less than a rated power for the third bidirectional converter circuit.

According to a second aspect there is provided a controller for an electrical power distribution system, the controller configured to perform the method according to the first aspect.

According to a third aspect there is provided a computer program comprising instructions for causing a controller to perform the method according to the first aspect. The computer program may be embodied on a non-volatile storage medium.

According to a fourth aspect there is provided an electrical power distribution system, comprising:
an electrical power storage unit;
a transformer;
a first bidirectional converter circuit connected between the electrical power storage unit and a first winding of the transformer;
a first DC bus;
a second DC bus;
a second bidirectional converter circuit connected between the first DC bus and a second winding of the transformer;
a third bidirectional converter circuit connected between the second DC bus and a third winding of the transformer; and
a controller connected for control of the first, second and third converter circuits to distribute electrical power between the electrical power storage unit, the first DC bus and the second DC bus.

The controller may be configured to control operation of the first, second and third bidirectional converter circuits to:

in a first mode, transfer electrical power from the electrical power storage unit to the first and/or second DC bus;

in a second mode, transfer electrical power from the first and/or second DC bus to the electrical power storage unit; and in a third mode, transfer electrical power from the first DC bus to the second DC bus or from the second DC bus to the first DC bus.

In the first mode, the controller may be configured to:

determine a power availability at the first bidirectional converter circuit from a charging state of the electrical energy storage unit; determine power requirements at the first and second DC buses;

control the first, second and third bidirectional converter circuits to transfer electrical power from the electrical energy storage unit to the first and second DC buses if the power availability of the electrical energy storage unit is greater than a combined power requirement at the first and second DC buses; and control the first, second and third bidirectional converter circuits to transfer electrical power from the electrical energy storage unit to the first DC bus if the power availability of the electrical energy storage unit is greater than the power requirement at the first DC bus but less than the combined power requirement at the first and second DC buses.

In the second mode, the controller may be configured to:

determine a power availability at the first and second DC buses;

determine a power requirement of the first bidirectional converter circuit from a charging state of the electrical energy storage unit; and control the first, second and third bidirectional converter circuits to transfer electrical power from the first and/or second DC bus to the electrical storage unit if the power availability at the first and/or second DC bus is greater than the power requirement of the electrical energy storage unit.

The electrical power distribution system may further comprise one or more propulsive electrical loads connected to the second DC bus via a respective converter. The first and second DC buses may be configured according to differing power quality requirements. The second DC bus may for example be configured to supply power only to the one or more propulsive electrical loads, which can allow the second DC bus to be configured according to a lower power quality requirement than the first DC bus, which can save overall weight compared to having the same high power quality requirement on each DC bus.

The electrical power distribution system may comprise an electrical generator connected to the second DC bus via a converter.

The electrical power distribution system may comprise an electrical generator connected to the first DC bus via a converter.

The first DC bus may be switchably connected to the second DC bus.

The first DC bus may be switchably connected to the second bidirectional converter circuit.

According to a fifth aspect there is provided a vehicle comprising the electrical power distribution system of the fourth aspect. The vehicle may be an aircraft.

The electrical power distribution architecture of the invention is advantageous because it allows an electrical storage unit to be more integrated with an electrical power distribution and allow for weight saving by reducing redundancy in the electrical power distribution system, which may be particularly advantageous when applied to weight critical applications such as aircraft.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
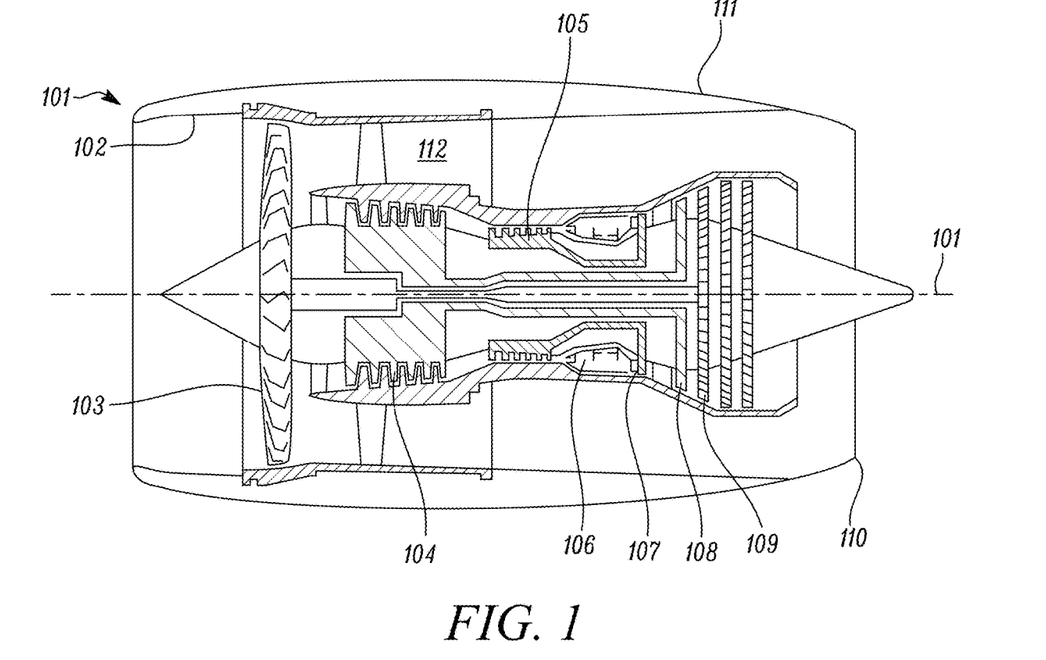
FIG. 1 is a sectional side view of a gas turbine engine.

With reference to FIG. 1, a turbofan-type gas turbine engine is generally indicated at 100, having a principal and rotational axis 101. The engine 100 comprises, in axial flow series, an air intake 102, a propulsive fan 103, an intermediate-pressure compressor 104, a high-pressure compressor 105, a combustor 106, a high-pressure turbine 107, an intermediate-pressure turbine 108, a low-pressure turbine 109 and an exhaust nozzle 110. A nacelle 111 generally surrounds the engine 100 and defines both the intake 102 and the exhaust nozzle 110.

The gas turbine engine 100 works in the conventional manner so that air entering the intake 102 is accelerated by the fan 103 to produce two air flows: a first air flow into the intermediate-pressure compressor 104 and a second air flow which passes through a bypass duct 112 to provide propulsive thrust. The intermediate-pressure compressor 104 compresses the air flow directed into it before delivering that air to the high-pressure compressor 105 where further compression takes place.

The compressed air exhausted from the high-pressure compressor 105 is directed into the combustor 106 where it is mixed with fuel and the mixture combusted. The resultant hot combustion products then expand through, and thereby drive the high-, intermediate- and low-pressure turbines 107, 108, 109 before being exhausted through the nozzle 110 to provide additional propulsive thrust. The high—107, intermediate—108 and low—109 pressure turbines drive respectively the high-pressure compressor 105, intermediate pressure compressor 104 and fan 103, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

An electrical machine may be integrated with a gas turbine engine of the type illustrated in FIG. 1, for example an electric generator driven from one of the shafts to generate AC power or an electric starter motor arranged to drive one of the shafts. Such electrical machines may be connected to an electrical power distribution system 200 of the type illustrated in FIG. 2. The electrical power distribution system 200 comprises an electrical power storage unit, or battery, 201 connected to first and second DC buses 205, 207 via a transformer 202 and first, second and third bidirectional current converters 204, 209, 210. Each DC bus 205, 207 may be connected to a variety of electrical loads or supplies including electrical machines 206, 208, i.e. electrical motors or generators.

Figure 2:
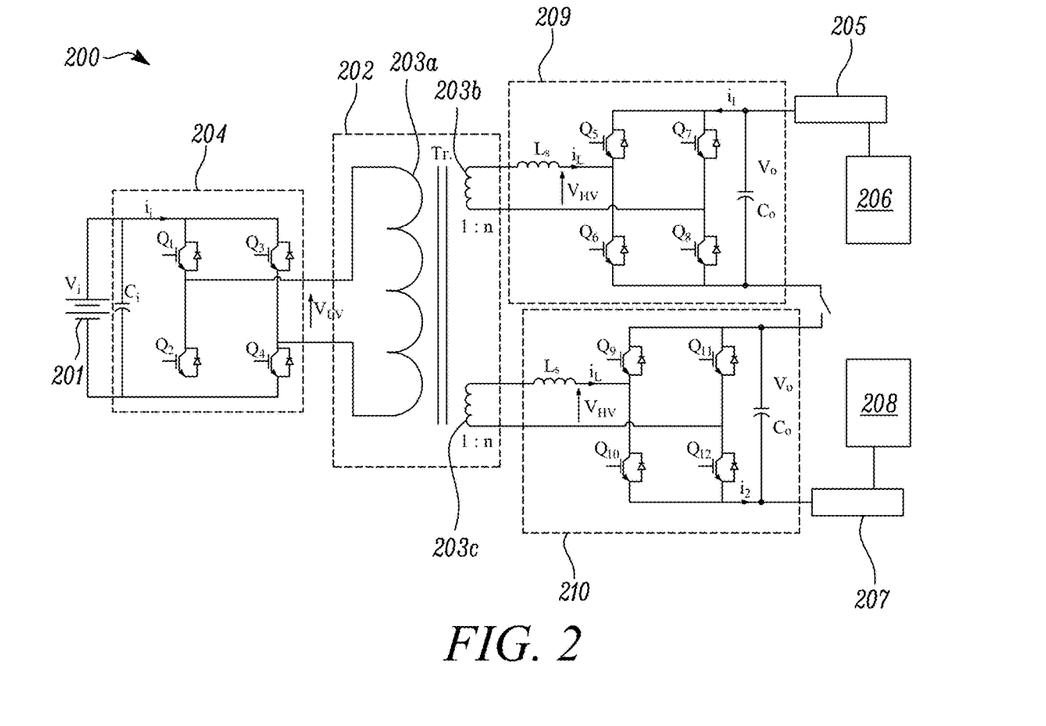
FIG. 2 is a schematic diagram of an electrical power distribution system.

A first bidirectional converter circuit 204 connects the electrical storage unit 201 to a first winding 203a of the transformer 202. A second bidirectional converter circuit 209 connects the first DC bus 205 to a second winding 203b of the transformer 202. A third bidirectional converter circuit 210 connects the second DC bus 207 to a third winding 203c of the transformer 202. Further windings and associated bidirectional converter circuits may be connected to the transformer to provide additional DC buses.

Figure 3:
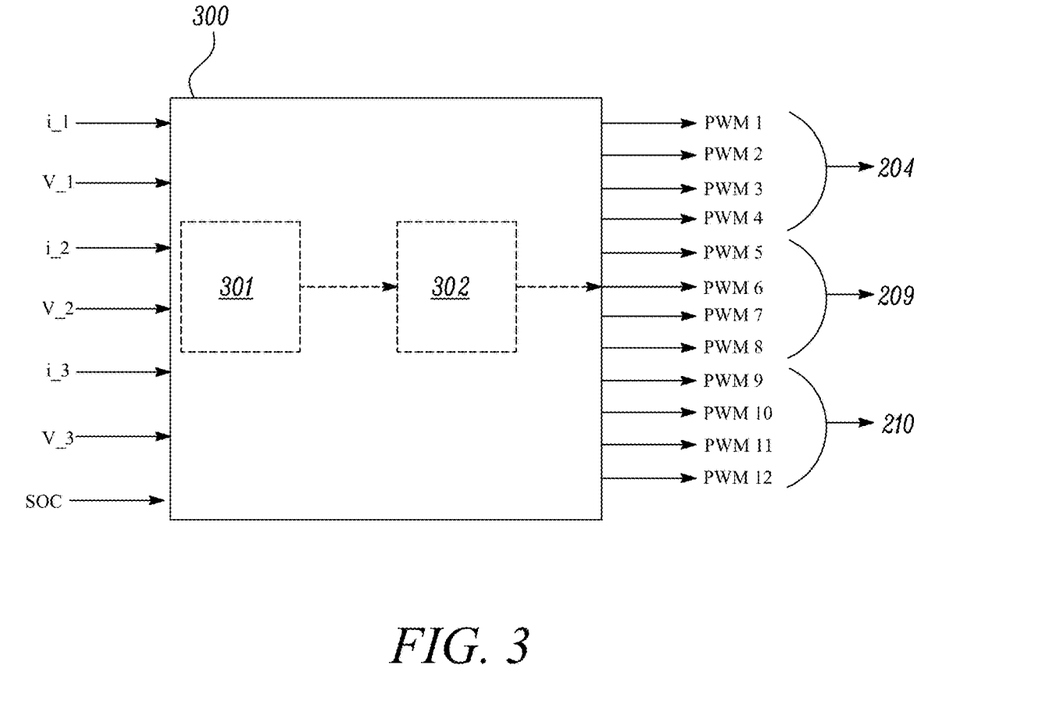
FIG. 3 is a schematic diagram of a controller for the electrical power distribution system of FIG. 1.

Each bidirectional converter circuit 204, 209, 210 in the embodiment illustrated in FIG. 2 comprises four switching circuits and a smoothing capacitor. A controller, described in more detail below, provides switching signals to each of the switching circuits to configure each converter circuit 204, 209, 210 to operate as a DC to AC converter or an AC to DC converter depending on the direction of power flow, as well as to control the level of power converted through pulse width modulation (PWM). A general view of such a controller 300 is illustrated in FIG. 3. The controller 300 receives inputs of current i_1, i_2, i_3 and voltage V_1, V_2, V_3 from each of the converter circuits 204, 209, 210 and a state of charge (SOC) indication from the electrical power storage unit 201. A first, or master, control module 301 determines which one of a plurality of control schemes is to operate. The control module 301 may for example determine a control scheme dependent on a state of charge of the battery 201 and voltage levels measured the first and second buses 205, 207. If, for example, the voltage level at one of the DC buses 205, 207 falls due to an increase in power drawn from the bus, the control module 301 may select a control scheme that transfers power from the other bus and/or from the battery 201. If the state of charge of the battery 201 is low, the control module 301 may select a control scheme that transfers power from one or both of the buses 205, 207. The master control module 301 provides control signals to a second, or slave, control module 302, which determines a plurality of switching signals PWM1-12 to be sent to the switching circuits of each of the converter circuits 204, 209, 210. Switching signals PWM1-4 are sent to switches Q1-4 of the first converter circuit 204, switching signals PWM5-8 are sent to switches Q5-8 of the second converter circuit 209, and switching signals PWM9-12 are sent to switches Q9-12 of the third converter circuit 210.

Figure 4:
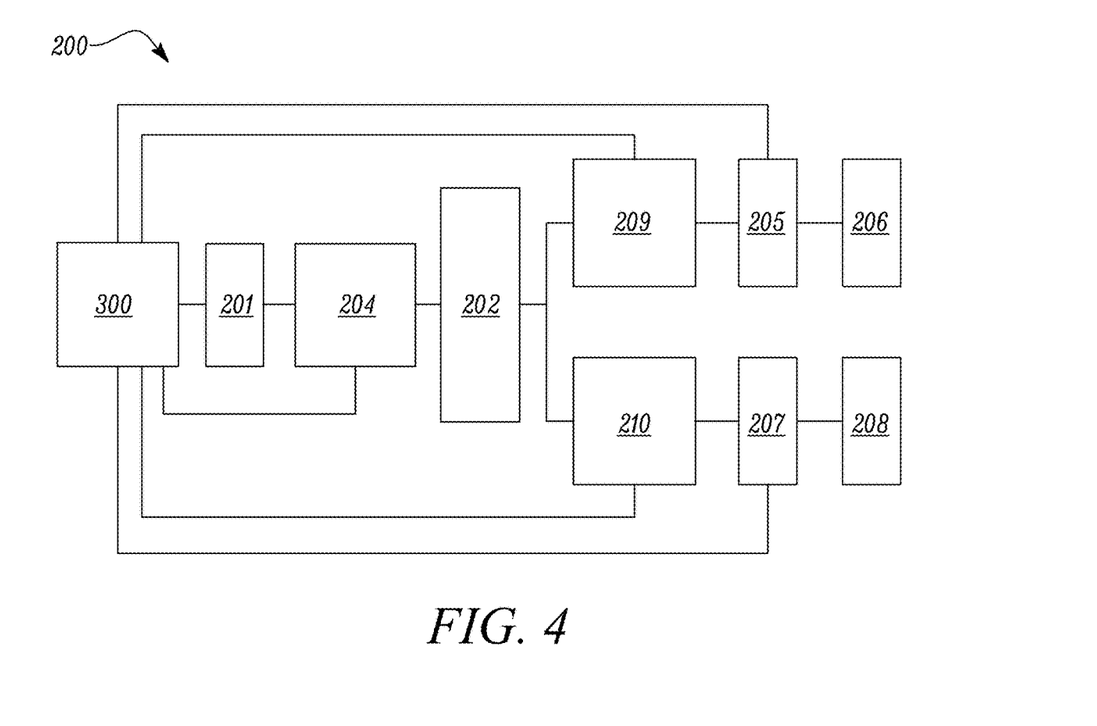
FIG. 4 is a schematic diagram of the electrical power distribution system of FIG. 2 in combination with the controller of FIG. 3.

FIG. 4 illustrates the electrical power distribution system 200 of FIG. 2 in modular form, in combination with the controller 300 of FIG. 3. As detailed above, the controller 300 receives signals from the electrical power storage unit 201 and the first and second buses 205, 207, and sends signals to the first, second and third bidirectional converter circuits 204, 209, 210.

Figure 5:
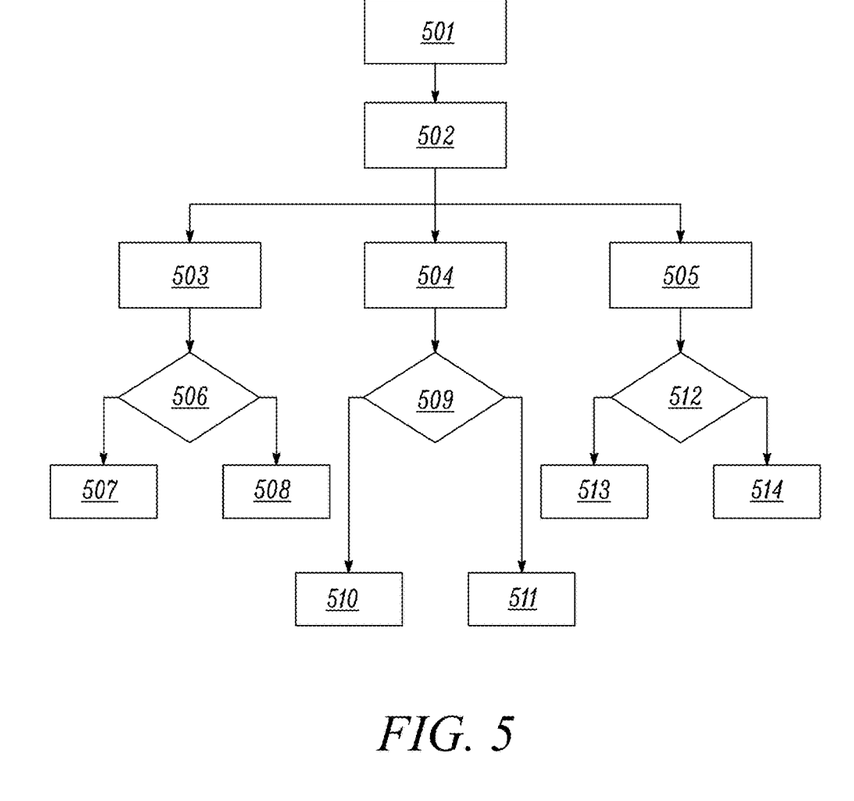
FIG. 5 is a schematic flow diagram illustrating example methods of operating the electrical power distribution system of FIG. 1.

FIG. 5 illustrates in schematic flow diagram form an example series of operations implemented by the controller 300 for controlling operation of the electrical power distribution system 200. In a first step 501, the controller 300 determines a state of charge of the electrical power storage unit 201, which may be used to determine an energy availability or an energy requirement of the electrical power storage unit 201. An energy availability of the electrical power storage unit 201 may be a measure of how much energy can be provided from the storage unit 201, while an energy requirement is essentially the inverse of availability, i.e. a measure of how much energy can be provided to the storage unit 201. The controller 300 also determines, based on current and voltage measurements at each DC bus 205, 207 a level of power availability or power requirement at each bus 205, 207.

Based on the power requirements, availability and state of charge, at step 502 the controller 300 then determines which one of three modes 503, 504, 505 the converter circuits 204, 209, 210 are to operate in. In a first mode 503, power is transferred from the electrical power storage unit 201 to one or both of the first and second DC buses 205, 207. In a second mode 504, power is transferred from one or both of the DC buses to the electrical power storage unit 201. In a third mode 505, power is transferred between the first and second DC buses.

In the first mode 503, a comparison is made (step 506) between the power PB1 on the first bidirectional converter circuit 204 and the power PB2, PB3 on the second and third bidirectional converter circuits 209, 210. If the relationship PB1>PB2+PB3 is true, then power is transferred from the electrical power storage unit 201 to both of the DC buses 205, 207 (step 507). If not, power is transferred from the electrical power storage unit 201 to only one of the DC buses (step 508). In each case, power is not transferred between the first and second DC buses 205, 207.

In the second mode 504, the controller 300 determines whether there is additional power available on the first or second DC buses 205, 207 that can be used to be provided to the electrical power storage unit 201. If so, the controller 300 arranges the converter circuits 204, 209, 210 to transfer power from one of the DC buses (step 510) or both of the DC buses (step 511).

In the third mode 505, the controller 300 determines whether a calculated power at one of the second or third converter circuits 109, 110 is greater than a rated power for that converter circuit while a calculated power at the other converter circuit is less than its rated power. If so, power is transferred either from the first DC bus 105 to the second DC bus 107 if the power at the second converter circuit 109 is greater than a rated power for that circuit (step 513) or from the second DC bus 107 to the first DC bus 105 if the power at the third converter circuit 110 is greater than a rated power for that circuit (step 514).

Figure 6:
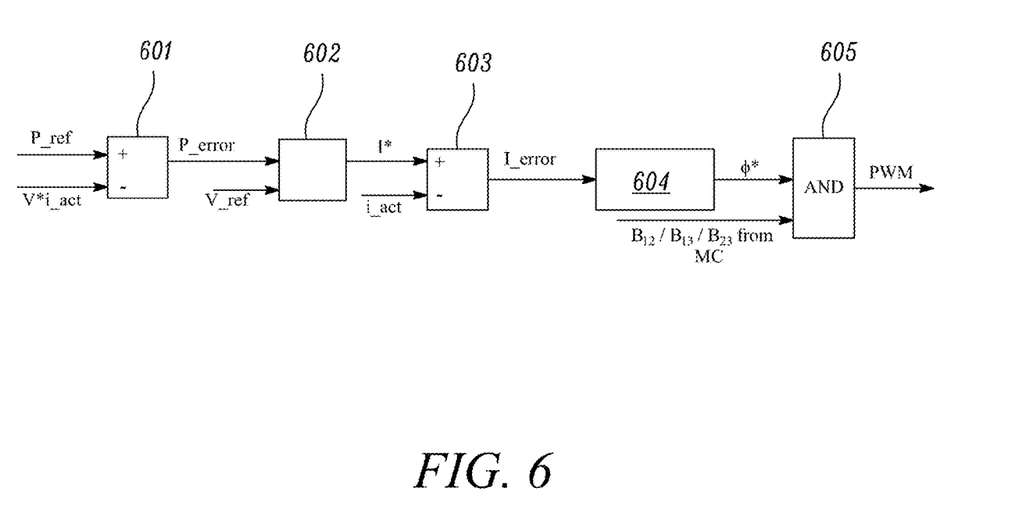
FIG. 6 is a schematic diagram of a control system for generating PWM signals for the converters of the electrical power distribution system of FIG. 1.
Figure 7A:
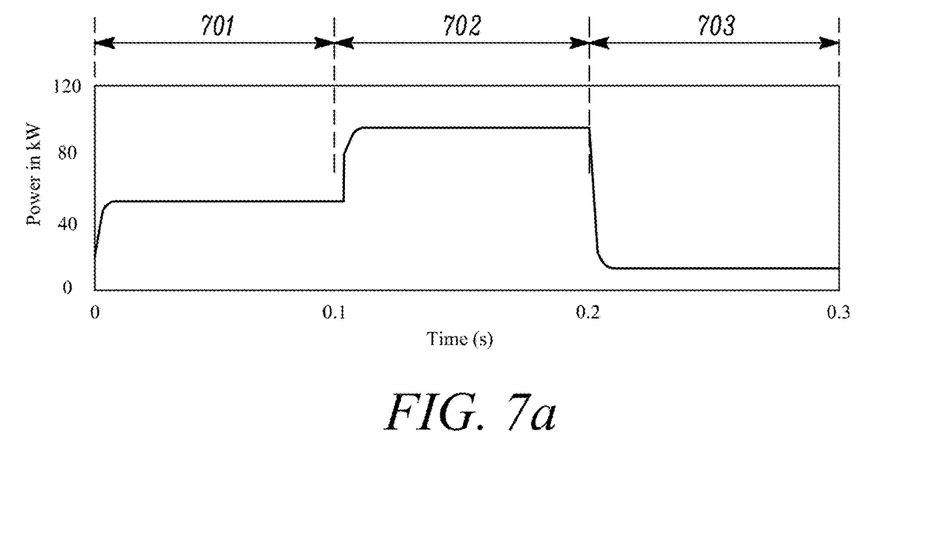
FIGS. 7a-c and 8a-c are example plots of transferred power as a function of time for various modes of operation of the electrical power distribution system.
Figure 7B:
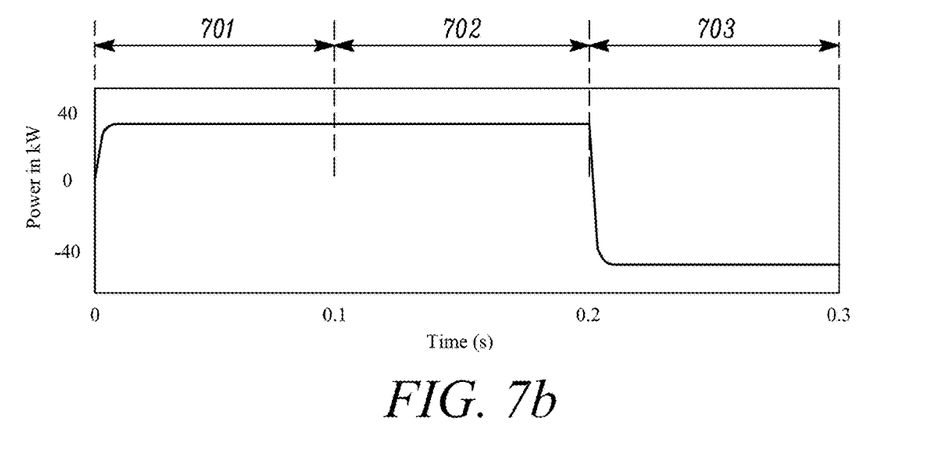
Figure 7C:
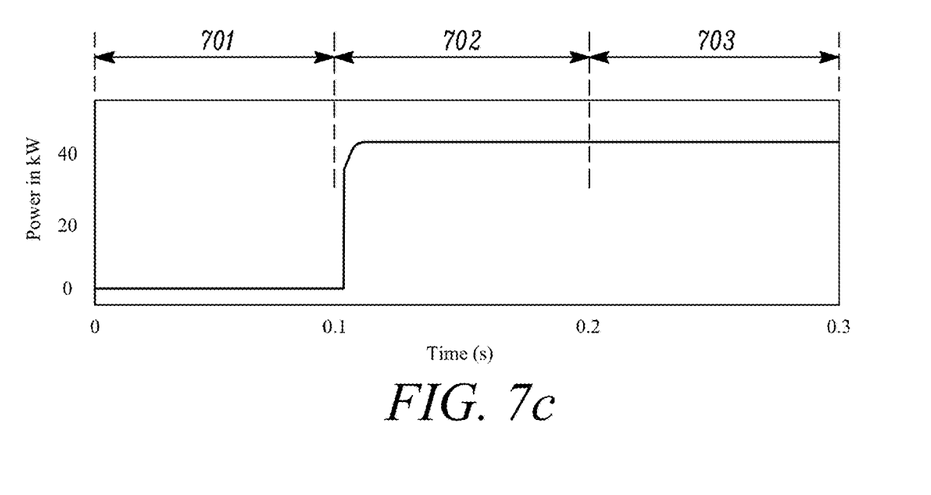
Figure 8A:
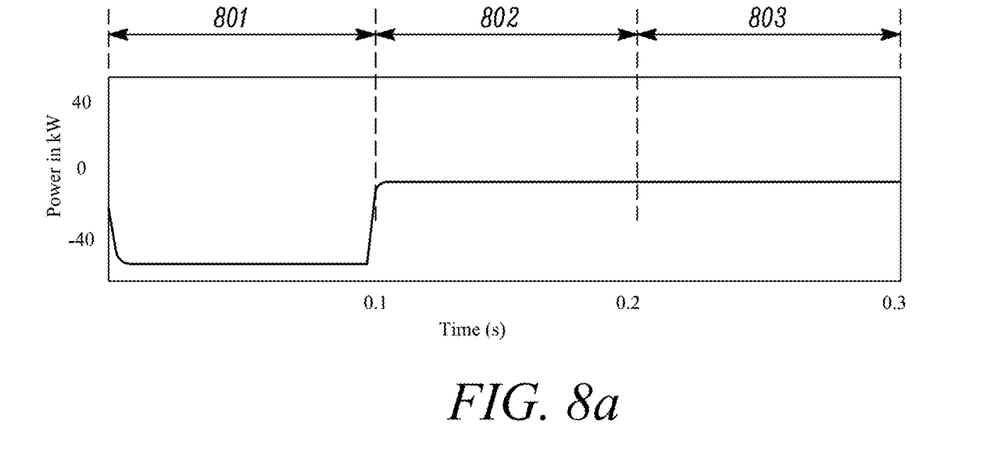
Figure 8B:
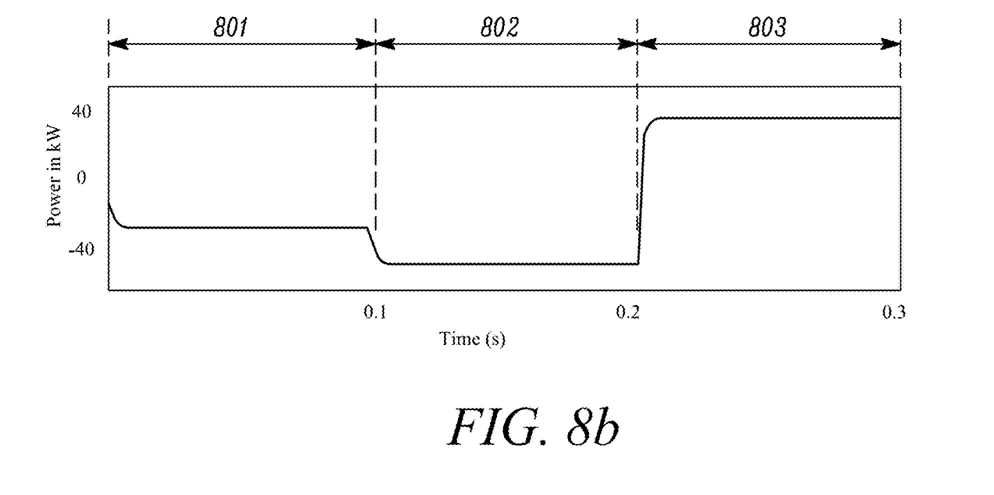
Figure 8C:
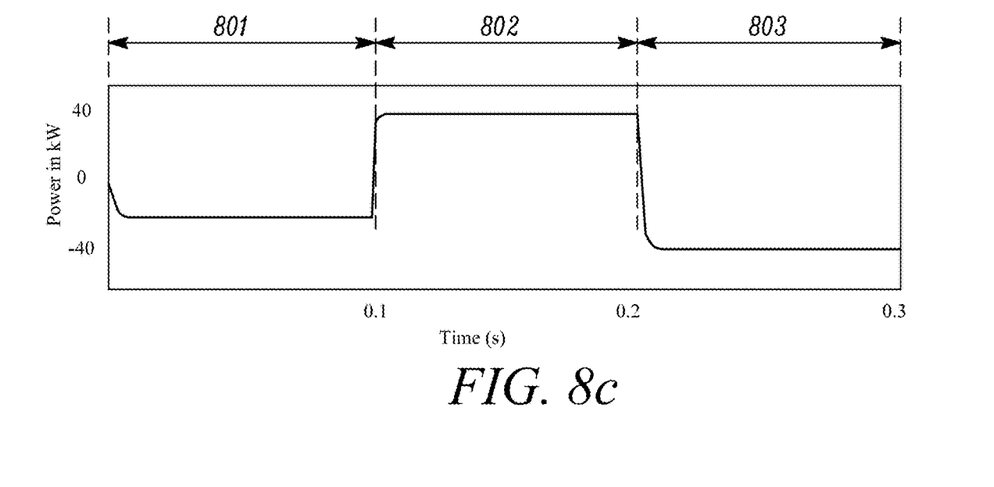

The slave control module 302 may operate to control the amount of power transferred between the DC buses 205, 207 and the electrical power storage unit 201 according to the block diagram shown in FIG. 6. This illustrates a series of operations that result in a PWM signal provided to one of the bidirectional converter circuits. A first operation 601 compares a reference power level P_ref with a calculated power level V*i_act. An output from this operation 601 provides an error signal P_error to a second operation 602, in which this error signal is divided by a reference voltage V_ref to provide a reference current I*. In a third operation 603 the reference current is compared with the actual current i_act to provide a current error signal I_error to a fourth operation 604, in which a tuned PI regulator transforms the current error signal to a phase shift ϕ*. The phase shift signal is then AND combined with signals received from the master controller 301 to generate output PWM switching signals.

The signals received from the master controller may for example be indications as to the direction of power flow between the first, second and third bidirectional converter circuits 204, 209, 210. If, for example, power is to flow from the first converter circuit to the second circuit, a signal B12 may be +1, while if power is to flow in the reverse direction the signal may be −1 and if no power flow is required the signal may be 0. The same principle may be applied for power flowing between the second and third bidirectional converter circuits 209, 210, which may be termed B23, and for power flowing between the first and third bidirectional converter circuits 204, 210, which may be termed B13.

FIGS. 7*a-c* and 8*a-c* illustrate modelled power flows for each of the converter circuits over a range of cases, in which power for the first bidirectional converter circuit 204, termed B1, is shown in plot a), the second bidirectional converter circuit 209, termed B2, in plot b) and the third bidirectional converter circuit 210, termed B3, in plot c). In FIG. 7, in a first time period 701, power flows from B1 to B2, such that power is received at B2 from B1 and B3 is off. In a second time period 702, power flows from B1 to both B2 and B3, such that power is received from B1 at B2 and B3. In a third time period 703, no power flows from B1 and power is sent from B3 to B2. In FIG. 8, in a first time period 801 power flows from B2 and B3 to charge the electrical power storage unit. In a second time period 802 power is sent from B3 to B2 and B1 is off. In a third time period 803, power is sent from B2 to B3. These example power flows illustrate how an electrical power distribution system can be operated to balance electrical power flows between storage, generation and supply to optimise operation of the system.

Figure 9:
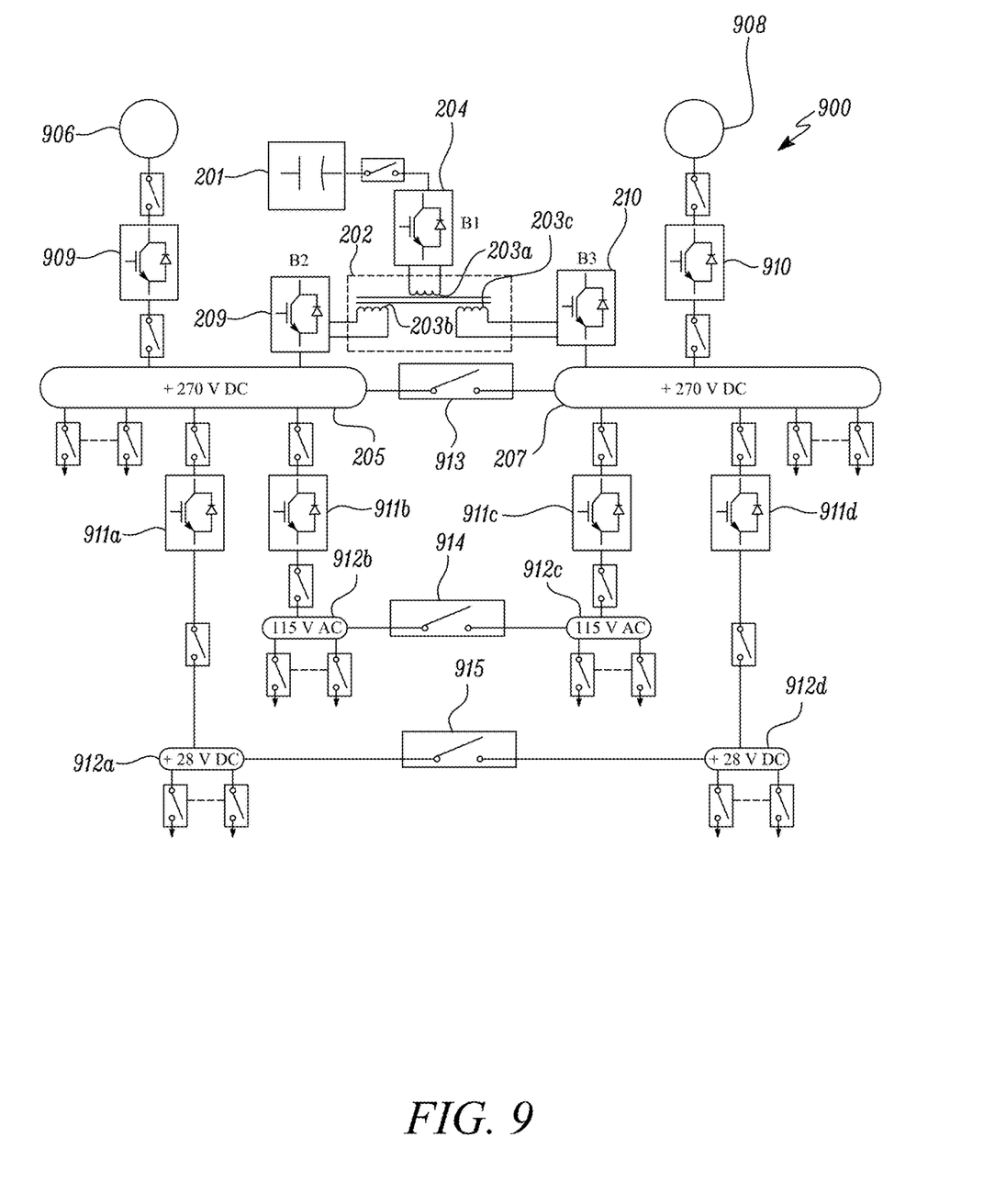
FIG. 9 is a schematic diagram of an alternative example of an electrical power distribution system.

FIG. 9 illustrates an example electrical power distribution system 900 incorporating the features described above. As with the system 200 of FIG. 2, the system 900 comprises an electrical power storage unit, or battery, 201, a transformer 202 having first, second and third windings 203*a-c*, first, second and third bidirectional converter circuits 204, 209, 210 (alternatively termed B1, B2, B3 respectively) connected to respective first, second and third windings 203*a-c* of the transformer 202.

First and second DC buses 205, 207, connected to respective second and third bidirectional converter circuits 204, 209, are connected to respective first and second electrical machines 906, 908. In this case, the first electrical machine is an engine starter generator (ESG) 906 and the second electrical machine is a generator 908, both of which are switchably connected to respective DC buses 205, 207 by a respective converter 909, 910. The ESG 906 can act as either a motor, for example for use in starting operation of a gas turbine engine, or as a generator once the engine is operating, whereas the generator 908 acts only as a generator. The system 900 may be configured to distribute power provided by the generators 906, 908 to the battery 201 and/or to loads connected to either DC bus 205, 207 according to the power requirements of the loads connected to the DC buses 205, 207 and the state of charge of the battery 201.

Each DC bus 205 may be connected via further converters 911*a-d* to DC buses 912*a-d* at different voltage levels to that of the DC buses 205, 207. In the example shown in FIG. 9, converters 911*a*, 911*d* convert the 270 volts DC level at DC buses 205, 207 to a 28 volts DC level for DC buses 912*a*, 912*d*, while converters 911*b*, 911*c* convert the 270 volts DC level at DC buses 205, 207 to a 115 V DC level at DC buses 912*b*, 912*c*. Each pair of DC buses may be switchably connected via respective switches 913, 914, 915, each of which enable direct connections to be made between each pair of DC buses for direct power sharing between the DC buses rather than via the transformer 202.

The switches 913, 914, 915 are optional. If the switches are not present, or are open, buses 205, 207 can be kept electrically isolated so that different power quality can be present on each bus, for example to allow one bus to be used for driving electric motors with a reduced power quality while the other bus is used to drive other loads requiring a higher power quality, thereby reducing the need for additional filtering on both buses 205, 207. The power quality requirements for each DC bus 205, 207 may be defined according to standards such as DO-160, MIL-STD-704 or MIL-STD-461. The power quality of a DC bus may for example be related to a variation on bus voltage under normal and abnormal voltage conditions, a voltage ripple present in the bus or EMI.

Designing a DC bus to meet more stringent power quality requirements will tend to increase overall weight as a result of additional components. Having DC buses or different power quality therefore can allow for a reduction in overall weight by allowing a lower power quality for a DC bus that is used to provide electrical power to some electrical components, while another DC bus may provide a higher power quality for components that require it, with both buses being provided power from a common source. In a general aspect therefore, the DC buses 205, 207 may be configured according to differing power quality requirements.

Figure 10:
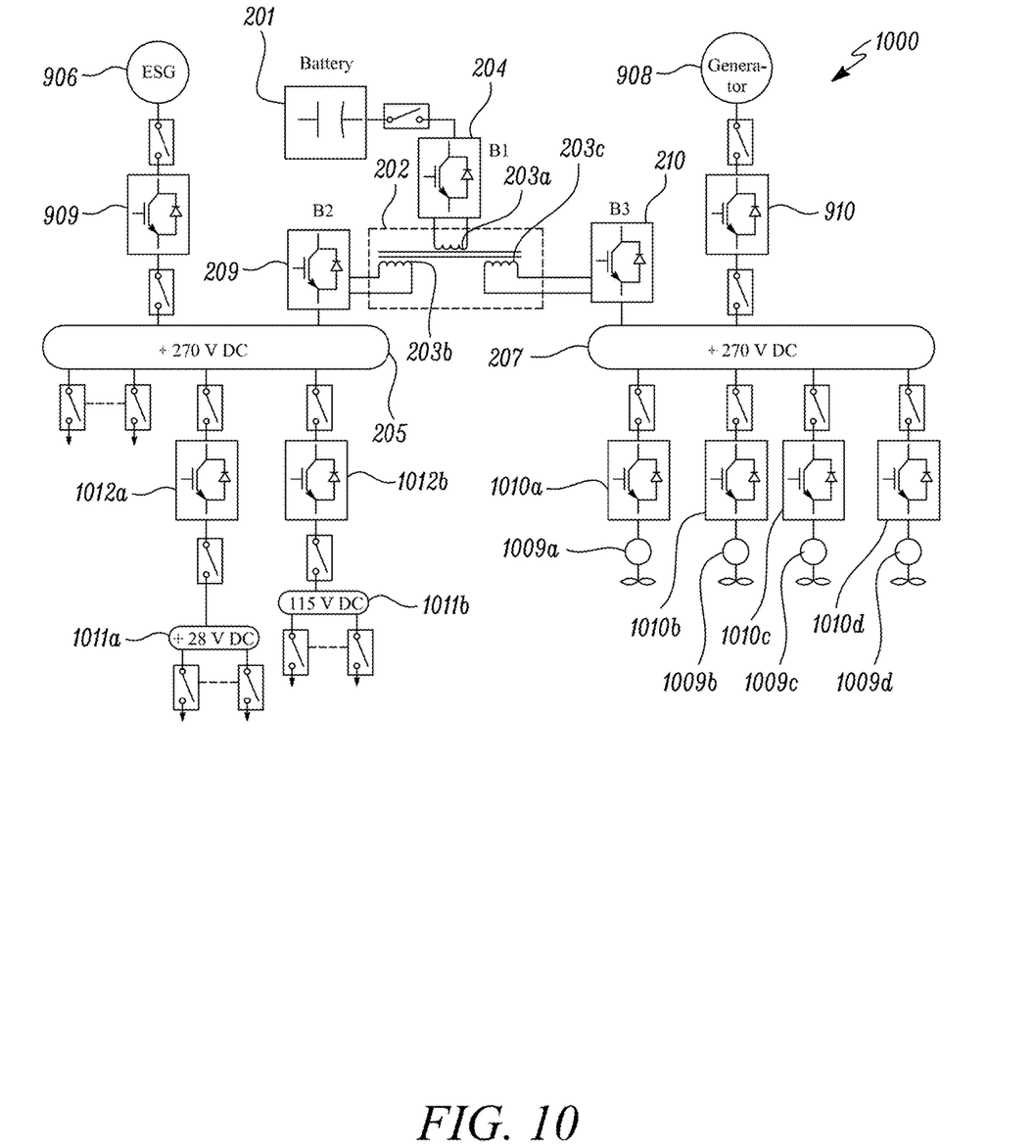
FIG. 10 is a schematic diagram of a further alternative example of an electrical power distribution system.

An alternative example electrical power distribution system 1000 is illustrated in FIG. 10. As with the system 900 of FIG. 9, the system 1000 comprises an electrical power storage unit, or battery, 201, a transformer 202 having first, second and third windings 203*a-c*, first, second and third bidirectional converter circuits 204, 209, 210 (alternatively termed B1, B2, B3) connected to respective first, second and third windings 203*a-c* of the transformer 202, and first and second DC buses 205, 207 connected to respective first and second electrical machines 906, 908. Also, as with the system 900 of FIG. 9, the system 1000 may be configured to distribute power provided by generators 906, 908 to the battery 201 and/or to loads connected to either DC bus 205, 207 according to the power requirements of the loads connected to the DC buses 205, 207 and the state of charge of the battery 201.

In the system 1000 of FIG. 10, the battery 201 is arranged to supply power to both DC buses 205, 207 but, since the DC buses 205, 207 are isolated from each other by the transformer 202, the power quality at each DC bus may be different. The second DC bus 207, for example, may be connected to one or more propulsive loads 1009a-d, each of which may be switchably connected to the second DC bus 207 via respective converters 1010a-d. The power quality requirement at the second DC bus 207 does not therefore need to be as high as for first DC bus 205. A significant weight saving can be made by providing differing levels of power quality to different buses, while maintaining separation of the buses with the transformer 202. The first bus 205 may for example provide power to one of more further DC buses 1011a, 1011b via respective DC-DC converters 1012a, 1012b while the second bus 207 provides power only to one or more propulsive loads 1009a-d, for example in the form of electric motors for providing propulsive thrust for an aircraft in which the system 1000 is incorporated.

The DC bus voltages indicated on the example systems shown in FIGS. 9 and 10 may have different voltages to that shown. A "clean" bus may for example be provided at 270 volts DC, with a "dirty" bus having ±270 volts. Other voltages may also be possible depending on the application, with a higher voltage bus for propulsive loads being advantageous due to the higher powers involved. The second DC bus 207 may therefore have a higher voltage than the first DC bus 205, for example at ±325 volts, ±750 volts, ±1000 volts, or ±1.5 kilovolts.

Figure 11:
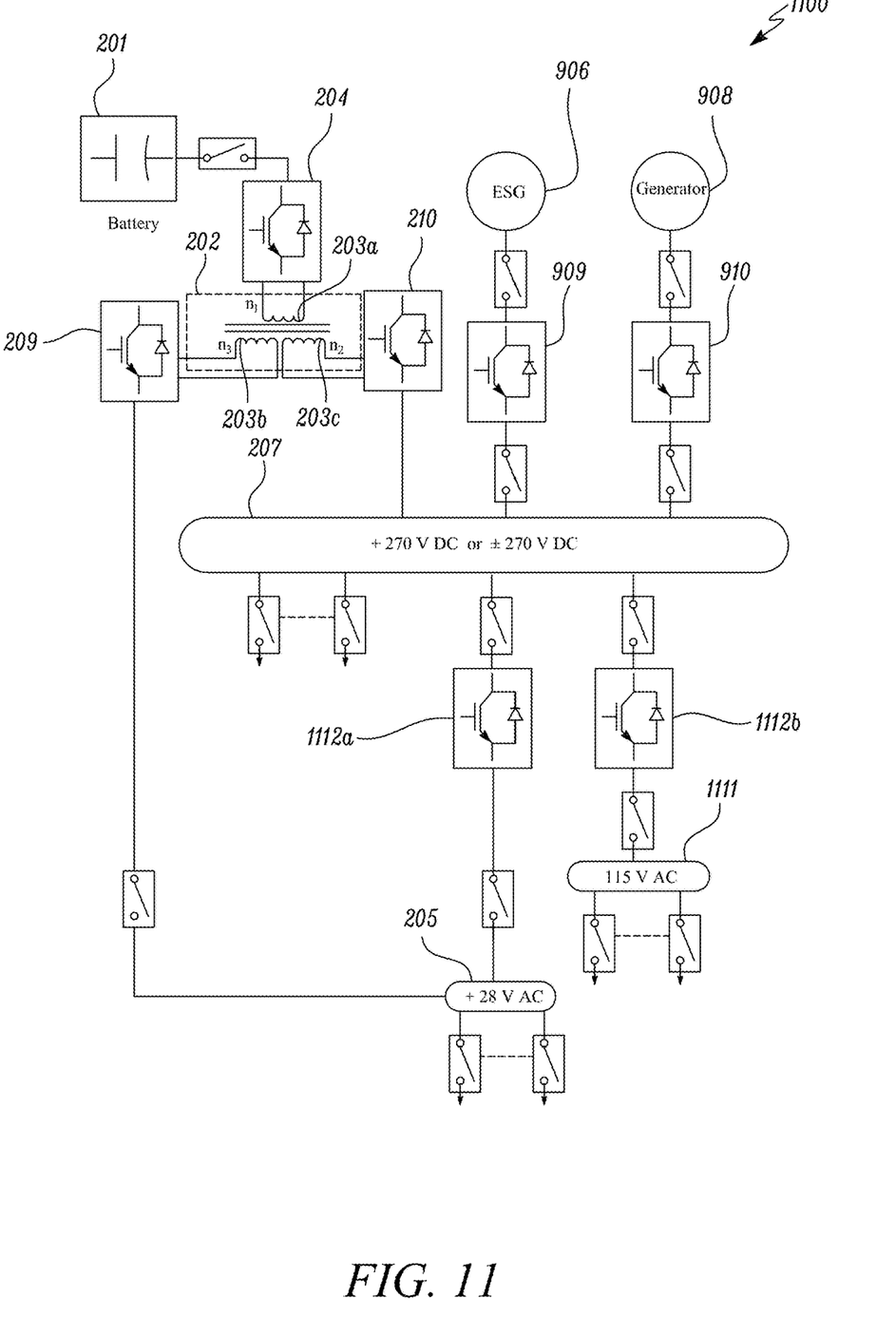
FIG. 11 is a schematic diagram of a further alternative example of an electrical power distribution system.

FIG. 11 illustrates a further alternative system 1100. As with the systems of FIGS. 9 and 10, the system 1100 comprises an electrical power storage unit, or battery, 201, a transformer 202 having first, second and third windings 203a-c, first, second and third bidirectional converter circuits 204, 209, 210 (alternatively termed B1, B2, B3) connected to respective first, second and third windings 203a-c of the transformer 202, and first and second DC buses 205, 207 connected respectively to the second and third windings 203b, 203c of the transformer 202. Generators 906, 908 are in this case both connected to the second DC bus 207 via respective converters 909, 910. As with the systems 900, 1000 of FIGS. 9 and 10, the system 1100 may be configured to distribute power provided by generators 906, 908 to the battery 201 and/or to loads connected to either DC bus 205, 207 according to the power requirements of the loads connected to the DC buses 205, 207 and the state of charge of the battery 201.

In the system 1100 of FIG. 11, the first DC bus 205 is switchably connected to the second bidirectional converter circuit 209 and also switchably connected to the second DC bus 207 via a DC-DC converter 1112a. This enables the first DC bus 205 to be either supplied directly from the battery 201 or from the second DC bus 207, depending on the state of charge of the battery 201 and the power available from the generators 906, 908. The first DC bus is indicated in FIG. 11 at 28 volts DC, which may be used for supplying various avionics subsystems on board the aircraft. A further DC bus 1111 may be connected via DC-DC converter 1112b to provide a further DC voltage level for other systems on board the aircraft. This configuration enables fault-tolerant operation of loads connected to the low voltage DC bus 205, which may be selectively supplied directly from the battery 201.

Figure 12:
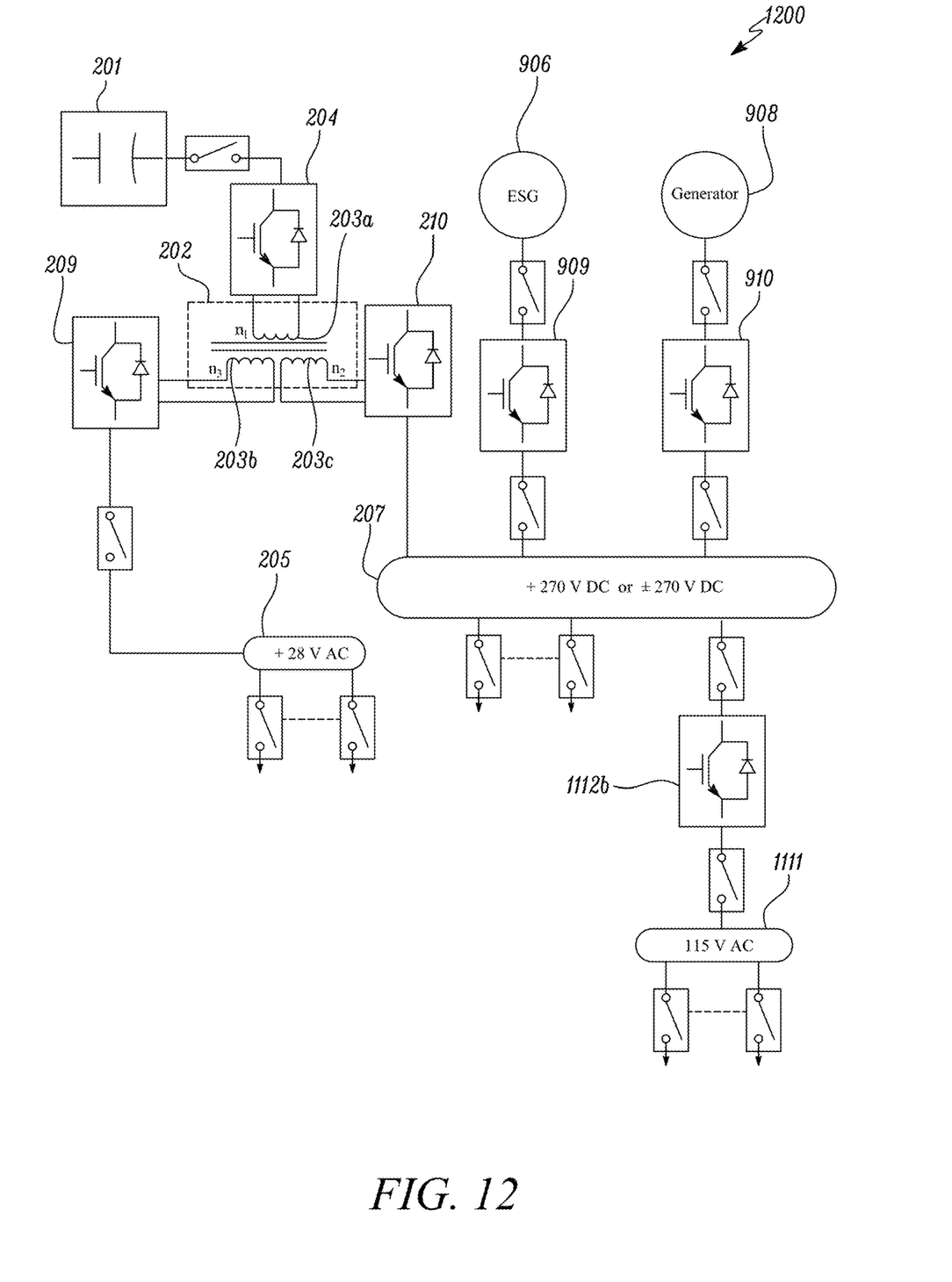
FIG. 12 is a schematic diagram of a further alternative example of an electrical power distribution system.

FIG. 12 illustrates a further alternative system 1200. As with the systems of FIGS. 9-11, the system 1200 comprises an electrical power storage unit, or battery, 201, a transformer 202 having first, second and third windings 203a-c, first, second and third bidirectional converter circuits 204, 209, 210 (alternatively termed B1, B2, B3) connected to respective first, second and third windings 203a-c of the transformer 202, and first and second DC buses 205, 207 connected respectively to the second and third windings 203b, 203c of the transformer 202. Generators 906, 908 are in this case, as with FIG. 11, both connected to the second DC bus 207 via respective converters 909, 910. As with the systems 900, 1000 of FIGS. 9 and 10, the system 1100 may be configured to distribute power provided by generators 906, 908 to the battery 201 and/or to loads connected to either DC bus 205, 207 according to the power requirements of the loads connected to the DC buses 205, 207 and the state of charge of the battery 201.

In the system 1200 of FIG. 12, the first DC bus 205 is switchably connected to the second bidirectional converter circuit 209 and is separate from the second DC bus 207.

For the system 1100 of FIG. 11, the battery 201 can supply power to the second bus 207 to provide power to the ESG 906 for starting. Avionics control loads connected to the first bus 205 may also be powered from the second bus 207 through the DC-DC converter 1112a, or may be supplied, for example at the start of operation, from the first bus 205 powered from the battery 201. For the system 1200 of FIG. 12, the battery 201 supplies power to the second bus 207 and to the ESG 906 for starting and also to the first bus 205 for powering avionics loads.

When the generators 906, 908 are functioning properly, the battery 201 can be charged through the transformer 202 and converters 204, 209, 210 and avionics control loads can be supplied through the DC-DC converter 1112a in the system 1100 of FIG. 11, and through the converter 209 in the system 1200 of FIG. 12.

If the generators 906, 908 fail, in the systems 1100, 1200 the avionics can be powered from the battery 201 via the converter 209 or alternatively, in the system 1100, from the converter 1112a.

Figure 13:
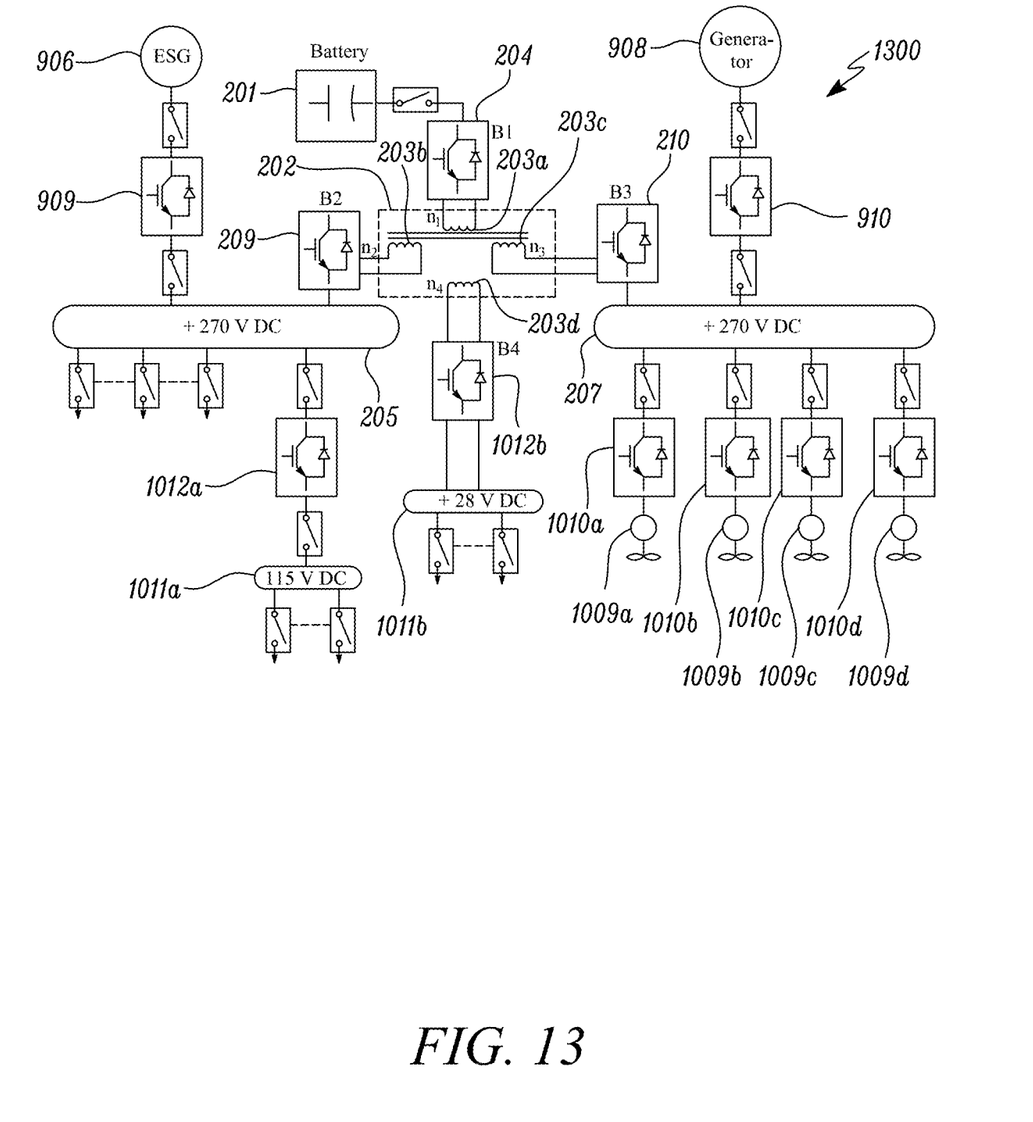
FIG. 13 is a schematic diagram of a further alternative example of an electrical power distribution system.

The architecture shown in FIGS. 9-12 can be further expanded into systems where further DC buses may be supplied from the transformer 202, such as in the example system 1300 illustrated in FIG. 13. This system 1300 has features corresponding to those in the system 1000 in FIG. 10, with the difference that the DC bus 1011b is connected via converter 1012b to a fourth winding 203d on the transformer 202. This bus 1011b, which may be a low voltage DC bus, for example at 28 V DC, can be powered selectively from the first and second DC buses 205, 207 or from the battery 201. The system 1300 can thereby be made more fault tolerant in addition to reducing the overall weight of the system by using only a single energy storage unit 201.

In summary, the various example systems and methods described herein enable power sharing between different buses that may function at different power levels. Converters may be used to support transient power requirements and load balancing, and their capacity can be optimally used. A further advantage is in providing fault-tolerant operation, enabling power to be supplied to critical loads from alternative sources, and in providing greater flexibility for operating a power distribution architecture, allowing for different modes of operation depending on the requirements.

Figure 14:
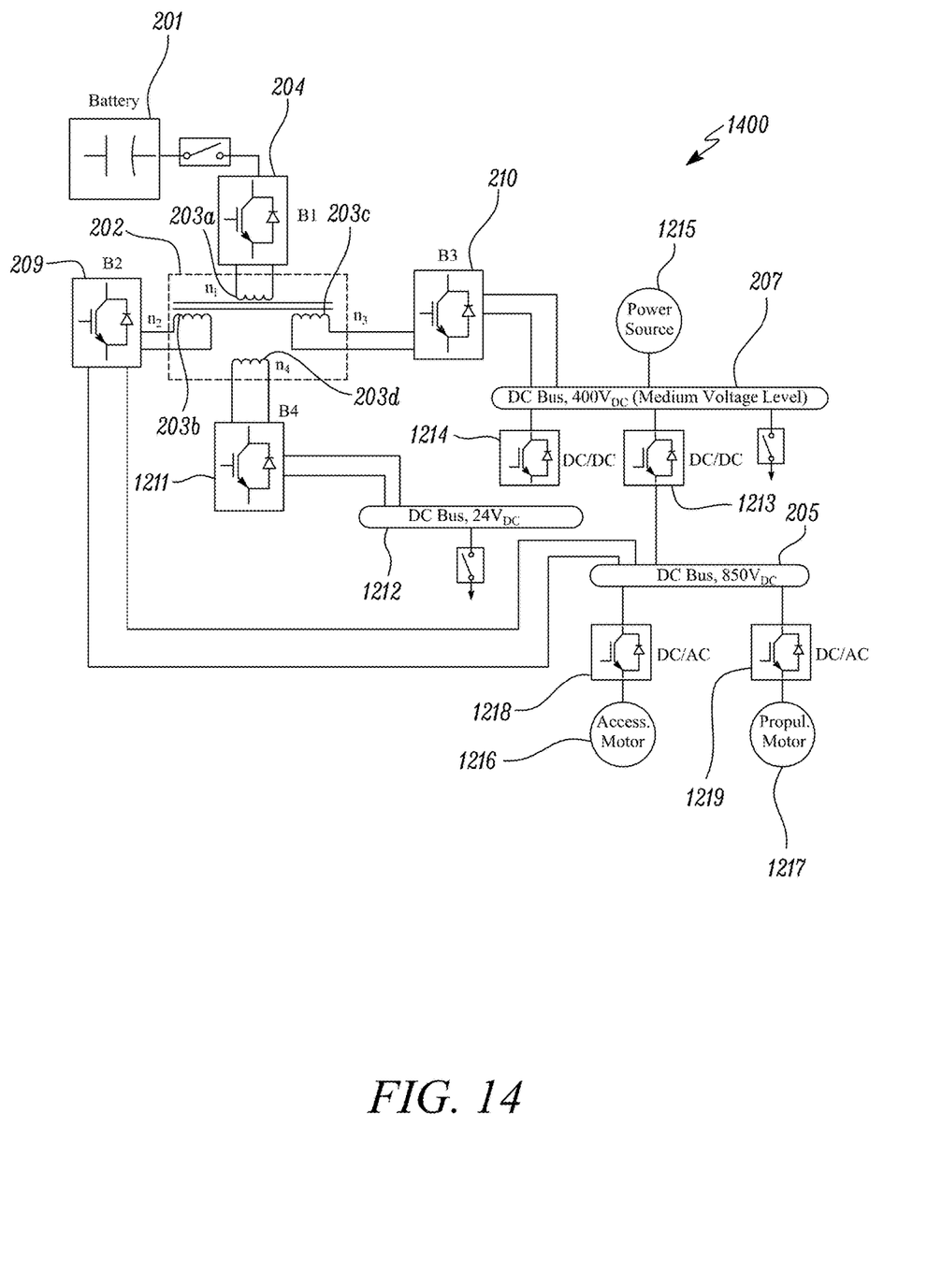
FIG. 14 is a schematic diagram of a further alternative example of an electrical power distribution system.

An electrical power distribution system as described herein may be used for distributing power on board an aircraft or alternatively may be used for distributing power on board other vehicles such as an electric ground vehicle or for electrical power distribution in a stationary system. An example system 1400 for use in an electric vehicle is illustrated in FIG. 14, the system 1400 comprising an electrical power storage unit 201, a transformer 202 having first, second third and fourth windings 203a-d, first, second third and fourth bidirectional converter circuits 204, 209, 210, 1211 connected to the respective windings 203a-d. The first converter circuit 204 is connected between the electrical power storage unit 201 and the first winding 203a. The second converter circuit 209 is connected between a first DC bus 205 and the second winding 203b. The third converter circuit 210 is connected between a second DC bus 207 and the third winding 203c. The fourth converter circuit 1211 is connected between a third DC bus 1212 and the fourth winding 203d. DC buses 207, 205 are connected via a bidirectional DC-DC converter 1213 and DC buses 207, 1212 are connected via a further bidirectional DC-DC converter 1214. DC bus 205 powers motors 1216, 1217 via DC-AC converters 1218, 1219 and DC bus 207 is connected to a power source 1215. In operation electrical power may be distributed throughout the system 1400 similarly to that described above. In addition, DC-DC converters 1214, 1213 may be used to distribute power between the DC buses 207, 1212, 205. The addition of the transformer 202 and associated connected components enables the system to have a higher fault tolerant capability.

In each of the examples described herein, the electrical energy storage unit 201 may be a battery, for example a chemical battery, or in some examples may be replaced or incorporate a capacitor for electrical energy storage, commonly known as a "supercapacitor," an advantage of which can be higher charging and discharging rates.

It will be understood that the invention is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

The invention claimed is:

1. A method of operating an electrical power distribution system, the electrical power distribution system comprising: an electrical power storage unit; a transformer having first, second and third windings; a first bidirectional converter circuit connected between the electrical power storage unit and the first winding; a first DC bus; a second DC bus; a second bidirectional converter circuit connected between the first DC bus and the second winding; and a third bidirectional converter circuit connected between the second DC bus and the third winding, and the method comprising:
   determining a state of charge of the electrical power storage unit;
   determining a power requirement or power availability at each of the first and second DC buses;
   operating the first, second and third bidirectional converter circuits to balance electrical power distribution between the electrical power storage unit and the first and second DC buses;
   determining a power availability at the first bidirectional converter circuit from a charging state of the electrical power storage unit;
   determining power requirements at the first and second DC buses;
   controlling the first, second and third bidirectional converter circuits to transfer electrical power from the electrical power storage unit to the first and second DC buses if the power availability of the electrical power storage unit is greater than a combined power requirement at the first and second DC buses; and
   controlling the first, second and third bidirectional converter circuits to transfer electrical power from the electrical power storage unit to the first DC bus if the power availability of the electrical power storage unit is greater than the power requirement at the first DC bus but less than the combined power requirement at the first and second DC buses.

2. The method of claim 1, in which operating the first, second and third bidirectional converter circuits comprises transferring electrical power from the electrical power storage unit to the first DC bus and/or the second DC bus if the power availability of the electrical power storage unit is greater than either or both of the determined power requirements at the first and second DC buses.

3. The method of claim 1, in which the second DC bus is connected to an electrical generator and operating the first, second and third bidirectional converter circuits comprises transferring electrical power from the second DC bus to the electrical power storage unit if the power availability at the second DC bus is greater than the power requirement at the electrical power storage unit.

4. The method of claim 1, in which the first and second DC buses are connected to respective first and second electrical generators and operating the first, second and third bidirectional converter circuits comprises transferring electrical power from the first DC bus and second DC bus to the electrical power storage unit if the power availability at the second DC bus is greater than zero but less than the power requirement at the electrical power storage unit and the power availability at the first DC bus is greater than zero.

5. The method of claim 1, in which operating the first, second and third bidirectional converter circuits comprises transferring electrical power from the first DC bus to the second DC bus if a calculated power at the second bidirectional converter circuit is greater than a rated power for the second bidirectional converter circuit and a calculated power at the third bidirectional converter circuit is less than a rated power for the third bidirectional converter circuit.

6. A controller for an electrical power distribution system, the controller configured to perform the method of claim 1.

7. A computer program comprising instructions for causing a controller to perform the method according to claim 1.

8. An electrical power distribution system, comprising:
   an electrical power storage unit;
   a transformer;
   a first bidirectional converter circuit connected between the electrical power storage unit and a first winding of the transformer;
   a first DC bus;
   a second DC bus;
   a second bidirectional converter circuit connected between the first DC bus and a second winding of the transformer;
   a third bidirectional converter circuit connected between the second DC bus and a third winding of the transformer; and
   a controller connected for control of the first, second and third converter circuits to distribute electrical power between the electrical power storage unit, the first DC bus and the second DC bus,
   wherein the first DC bus is switchably connected to the second DC bus.

9. The electrical power distribution system of claim 8, in which the controller is configured to control operation of the first, second and third bidirectional converter circuits to:
   in a first mode, transfer electrical power from the electrical power storage unit to at least one of the first and second DC bus;
   in a second mode, transfer electrical power from the at least one of the first and second DC bus to the electrical power storage unit; and in a third mode, transfer electrical power from the first DC bus to the second DC bus or from the second DC bus to the first DC bus.

10. The electrical power distribution system of claim 9, in which, in the second mode, the controller is configured to:
   determine a power availability at the first and second DC buses;
   determine a power requirement of the first bidirectional converter circuit from a charging state of the electrical power storage unit; and
   control the first, second and third bidirectional converter circuits to transfer electrical power from the at least one of the first and second DC bus to the electrical power storage unit if the power availability at the at least one of the first and second DC bus is greater than the power requirement of the electrical power storage unit.

11. The electrical power distribution system of claim 8, further comprising one or more propulsive electrical loads connected to the second DC bus via a respective converter.

12. The electrical power distribution system of claim 11, in which the second DC bus is configured to supply power only to the one or more propulsive electrical loads.

13. The electrical power distribution system of claim 8, in which the first and second DC buses are configured according to differing power quality requirements.

14. The electrical power distribution system of claim 8, further comprising an electrical generator connected to the second DC bus via a converter.

15. The electrical power distribution system of claim 8, further comprising an electrical generator connected to the first DC bus via a converter.

16. A vehicle comprising the electrical power distribution system of claim 8.

17. The vehicle of claim 16, in which the vehicle is an aircraft.

18. An electrical power distribution system, comprising:
   an electrical power storage unit;
   a transformer;
   a first bidirectional converter circuit connected between the electrical power storage unit and a first winding of the transformer;
   a first DC bus;
   a second DC bus;
   a second bidirectional converter circuit connected between the first DC bus and a second winding of the transformer;
   a third bidirectional converter circuit connected between the second DC bus and a third winding of the transformer; and
   a controller connected for control of the first, second and third converter circuits to distribute electrical power between the electrical power storage unit, the first DC bus and the second DC bus,
   wherein the first DC bus is switchably connected to the second bidirectional converter circuit.

* * * * *